US008812578B2

(12) United States Patent
Druyan et al.

(10) Patent No.: US 8,812,578 B2
(45) Date of Patent: Aug. 19, 2014

(54) ESTABLISHING FUTURE START TIMES FOR JOBS TO BE EXECUTED IN A MULTI-CLUSTER ENVIRONMENT

(75) Inventors: Alexander Druyan, Brooklyn, NY (US); David P. Brelsford, Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 1188 days.

(21) Appl. No.: 12/266,670

(22) Filed: Nov. 7, 2008

(65) Prior Publication Data

US 2010/0122255 A1    May 13, 2010

(51) Int. Cl.
*G06F 15/16* (2006.01)
*H04L 29/08* (2006.01)
(52) U.S. Cl.
CPC .............. *H04L 67/325* (2013.01); *H04L 67/32* (2013.01); *H04L 29/08945* (2013.01); *H04L 29/08963* (2013.01)
USPC ........................................................ 709/201
(58) Field of Classification Search
CPC .................. H04L 29/08945; H04L 29/08963; H04L 67/32; H04L 37/325
USPC ........................................................ 709/201
See application file for complete search history.

(56) References Cited

U.S. PATENT DOCUMENTS

| | | | |
|---|---|---|---|
| 7,065,764 B1 | 6/2006 | Prael et al. | |
| 7,331,048 B2 | 2/2008 | Skovira | |
| 2003/0135621 A1 | 7/2003 | Romagnoli | |
| 2006/0067503 A1* | 3/2006 | Caugherty et al. | 379/221.07 |
| 2006/0106931 A1* | 5/2006 | Richoux | 709/226 |
| 2007/0143758 A1 | 6/2007 | Coppinger et al. | |
| 2007/0256078 A1* | 11/2007 | Falk et al. | 718/104 |
| 2010/0293549 A1 | 11/2010 | Brelsford et al. | |

FOREIGN PATENT DOCUMENTS

| | | |
|---|---|---|
| JP | 2003196436 | 7/2003 |
| JP | 2007140710 | 6/2007 |
| WO | WO2004104852 A1 | 12/2004 |
| WO | W02007023726 A1 | 3/2007 |

OTHER PUBLICATIONS

"Tivoli Workload Scheduler LoadLeveler: Using and Administering," Version 3, Release 4, IBM Publication No. SA22-7881-06, Oct. 2006, pp. 1-744.

* cited by examiner

*Primary Examiner* — Tom Y Chang
(74) *Attorney, Agent, or Firm* — Parashos T. Kalaitzis; Blanche E. Schiller, Esq.; Heslin Rothenberg Farley & Mesiti P.C.

(57) ABSTRACT

Start times are determined for jobs to be executed in the future in a multi-cluster environment. The start times are, for instance, the earliest start times in which the jobs may be executed. The start times are computed in logarithmic time, providing processing efficiencies for the multi-cluster environment. Processing efficiencies are further realized by employing parallel processing in determining the start times.

25 Claims, 6 Drawing Sheets

ESTABLISHING FUTURE START TIMES FOR JOBS TO BE EXECUTED IN A MULTI-CLUSTER ENVIRONMENT

This invention was made with Government support under Agreement No. HR0011-07-9-0002 awarded by DARPA. The Government has certain rights in the invention.

TECHNICAL FIELD

This invention relates, in general, to parallel processing within a multi-cluster computing environment, and in particular, to facilitating scheduling of jobs within the multi-cluster computing environment.

BACKGROUND OF THE INVENTION

A cluster computing environment is loosely defined as the coupling of at least two computers to cooperatively share a processing load. A multi-cluster environment is an environment which couples at least two clusters. In one example, the clusters are coupled via a communications network.

Within a multi-clustered environment, jobs are scheduled to be executed within each local cluster, as well as across clusters. The scheduling of the jobs is performed by job schedulers. In one example, a cluster may include its own job scheduler that is used to schedule jobs to be run locally. Further, the multi-cluster environment may include a main scheduler that is used to schedule jobs across the multi-cluster environment. The scheduling of jobs across clusters is referred to as grid scheduling. Grid scheduling provides efficient scheduler coordination for jobs scheduled across multiple high performance computer clusters.

SUMMARY OF THE INVENTION

In scheduling of jobs in such a multi-cluster environment, an efficient capability is needed for computing future start times for jobs. In one example, a need exists for a capability to determine future start times of jobs that is scalable to a multi-cluster environment. In one particular example, a need exists for an efficient technique to determine the earliest time a job can start in a multi-cluster environment. A need exists for a capability in which the time it takes to calculate future start times does not increase proportionally as the number of jobs on the queue increases.

The shortcomings of the prior art are overcome and additional advantages are provided through the provision of a method of facilitating determination of job start times in a multi-cluster environment. The method includes, for instance, determining a time region in which a job can execute in the multi-cluster environment, the time region comprising a period of time in which resource availabilities of a plurality of clusters of the multi-cluster environment are monotonically increasing; obtaining for the plurality of clusters resource availability information at one or more selected points within the time region, wherein the one or more selected points are chosen using an n-ary search; and using the resource availability information of the plurality of clusters to determine a start time for the job to be executed across multiple clusters of the multi-cluster environment.

Systems and program products relating to one or more aspects of the present invention are also described and claimed herein. Further, services relating to one or more aspects of the present invention are also described and may be claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION OF THE INVENTION

In accordance with an aspect of the present invention, a capability is provided for determining start times for jobs to be executed within a multi-cluster computing environment. In one example, the earliest start times for jobs to be executed in the future are determined.

Figure 1:
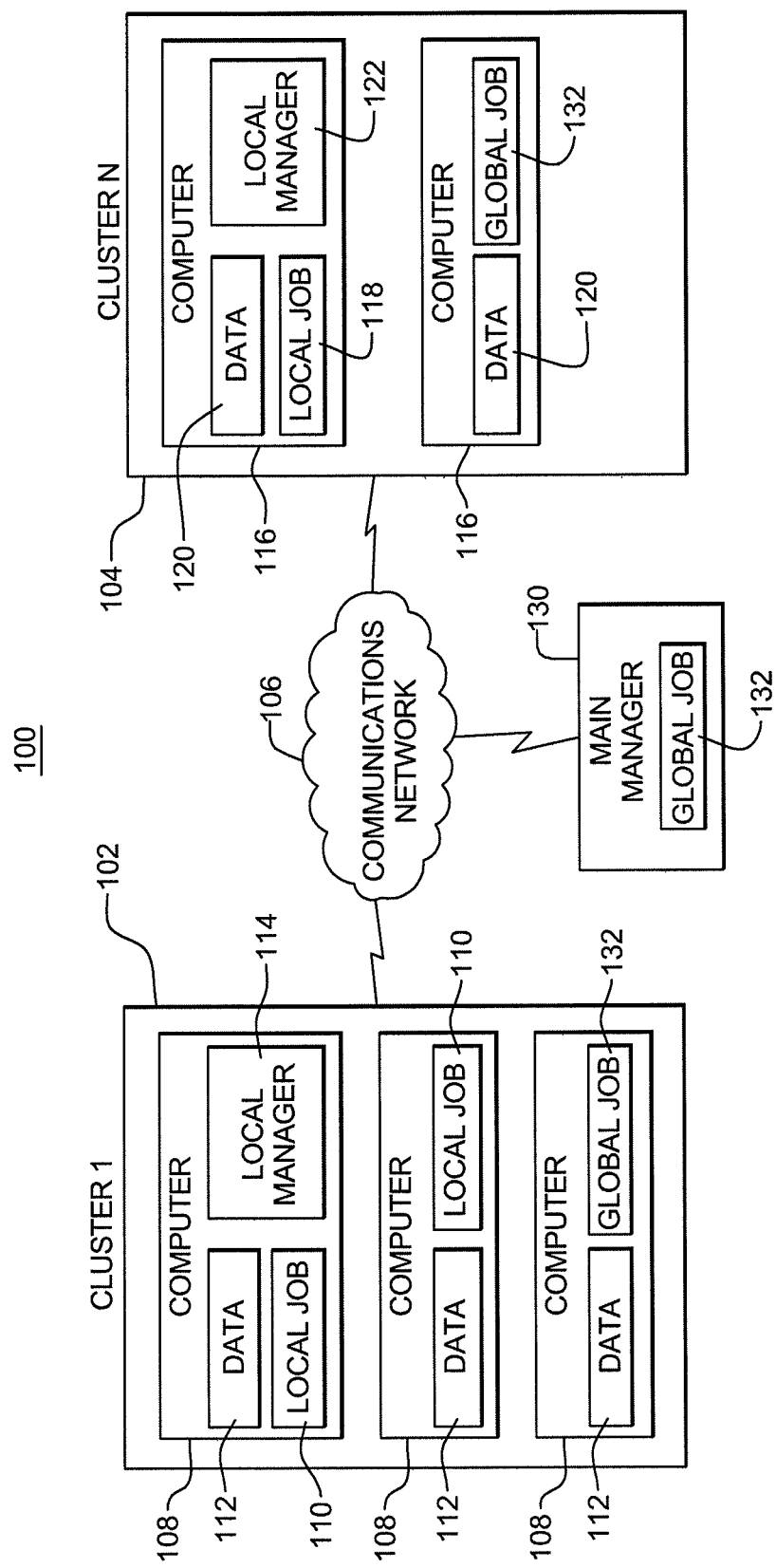
FIG. 1 depicts one example of a multi-cluster computing environment to incorporate and use one or more aspects of the present invention.

One example of a multi-cluster computing environment to incorporate and use one or more aspects of the present invention is described with reference to FIG. 1. In one example, a multi-cluster computing environment 100 includes one cluster 102 coupled to another cluster 104 via a communications network 106. Although in this example two clusters are depicted, it is understood that the multi-cluster environment can have more than two clusters. Cluster 102 includes, for instance, a plurality of computers 108 or other processing units coupled to one another via a connection, such as a wired connection, a wireless connection, a network, etc. As an example, computer 108 is an RS/6000® node offered by International Business Machines Corporation. RS/6000® is a registered trademark of International Business Machines Corporation, Armonk, N.Y. Many other examples also exist, including other computers provided by International Business Machines Corporation or other companies. One or more of computers 108 includes one or more local jobs 110 to be executed by the computer in which it is running, and data 112 for access by the local jobs, as well as other jobs. Further, one of the computers includes a local manager 114, which is used for various tasks, including scheduling of jobs on the cluster in which it is running.

Similarly, cluster 104 includes a plurality of computers 116 coupled to one another, one or more of which is also running one or more local jobs 118 and includes local data 120. The computers can be the same type as or different from those in cluster 102. Cluster 104 also includes a local manager 122 used for scheduling the local jobs, as well as performing other tasks.

In one example, each local manager to perform scheduling includes a scheduler. There are many types of schedulers and each cluster may have the same type of scheduler or a different type of scheduler. As examples, schedulers include LoadLeveler® offered by International Business Machines Corporation, and Portable Batch System (PBS), offered by Altare Grade Technologies, LLC, etc. One example of LoadLeveler® is described in an IBM® publication entitled, "Tivoli Workload Scheduler LoadLeveler: Using and Administering," Version 3, Release 4, IBM Pub. No. SA22-7881-06, October 2006, which is hereby incorporated herein by reference in its entirety. LoadLeveler® and IBM® are registered trademarks of International Business Machines Corporation, Armonk, N.Y.

In one example, at least one scheduler performs backfill scheduling. Backfill scheduling allows an application to run out of order as long as it does not effect the start time of an application already scheduled to execute. One example of backfill scheduling is described in U.S. Pat. No. 7,331,048, entitled "Backfill Scheduling of Applications Based on Data of the Applications," issued Feb. 12, 2008, which is hereby incorporated herein by reference in its entirety.

Cluster 102 and cluster 104 are coupled via, for instance, communications network 106, which may be a wired or wireless network including private and/or public communications infrastructures. Many types of networks can be used, as well as connections other than networks.

Multi-cluster computing environment 100 further includes, a main manager 130, which may be part of one of the clusters or coupled to the clusters via communications network 106 or another communications network or connection. Main manager 130 is responsible, in accordance with an aspect of the present invention, for communicating with the local managers to obtain resource availability information and to determine a start time for a job to be started in the future. For example, main manager 130 determines a future start time for a job 132 to be run across multiple clusters of the multi-cluster environment. In this example, global job 132 is to run on one or more computers of cluster 102 and one or more computers of cluster 104. The determination of start times for such jobs is described in further detail below.

Figure 2:
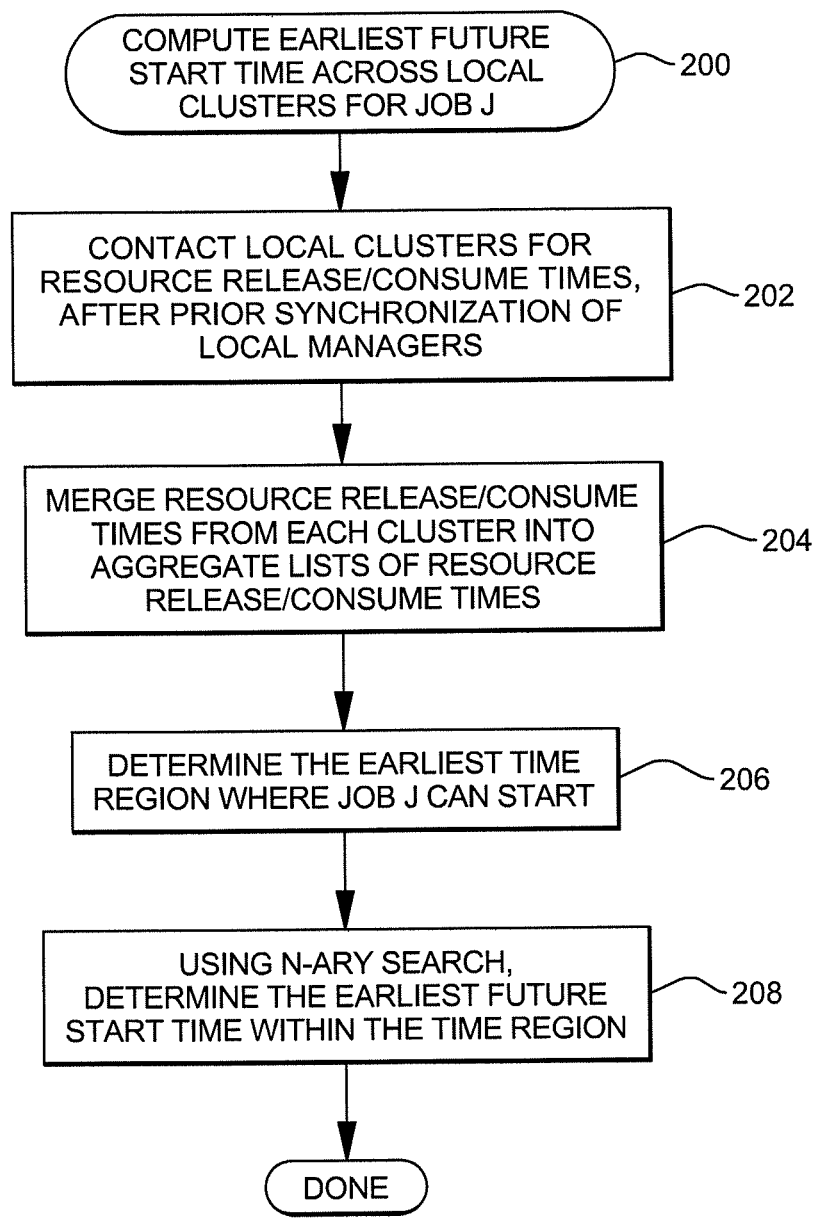
FIG. 2 depicts one embodiment of an overview of the logic associated with computing an earliest future start time for a job to be executed in the multi-cluster environment, in accordance with an aspect of the present invention.

One embodiment of the logic to determine the start time of a job (e.g., a job to run across clusters) is described with reference to FIG. 2. Referring to FIG. 2, STEP 200 is an entry point into the scheduling logic that receives as an argument job J for which the earliest future start time across local clusters is to be determined. To make this determination, a main manager, as an example, contacts the local clusters of the multi-cluster computing environment (all of the clusters or a subset thereof) to request resource information, STEP 202. In one example, the request for resource information is sent after the main manager synchronizes the local managers; i.e., after the main manager suspends scheduling by the local managers to freeze the resources. The request for resource information includes, for instance, release and consume times. A resource release time is a point in time on the local cluster when it is known that some resource is released; for example, when a job is believed to be complete, based on its wallclock time. A resource consume time is a point in time on the local cluster when it is known that some resource is consumed; for example, when a job is believed to start, based on its future start time.

In response to this request, the main manager receives the information and merges the resource release and consume times received from the clusters into two lists, STEP 204. The lists include an aggregate list of resource release times and an aggregate list of resource consume times.

Figure 3:
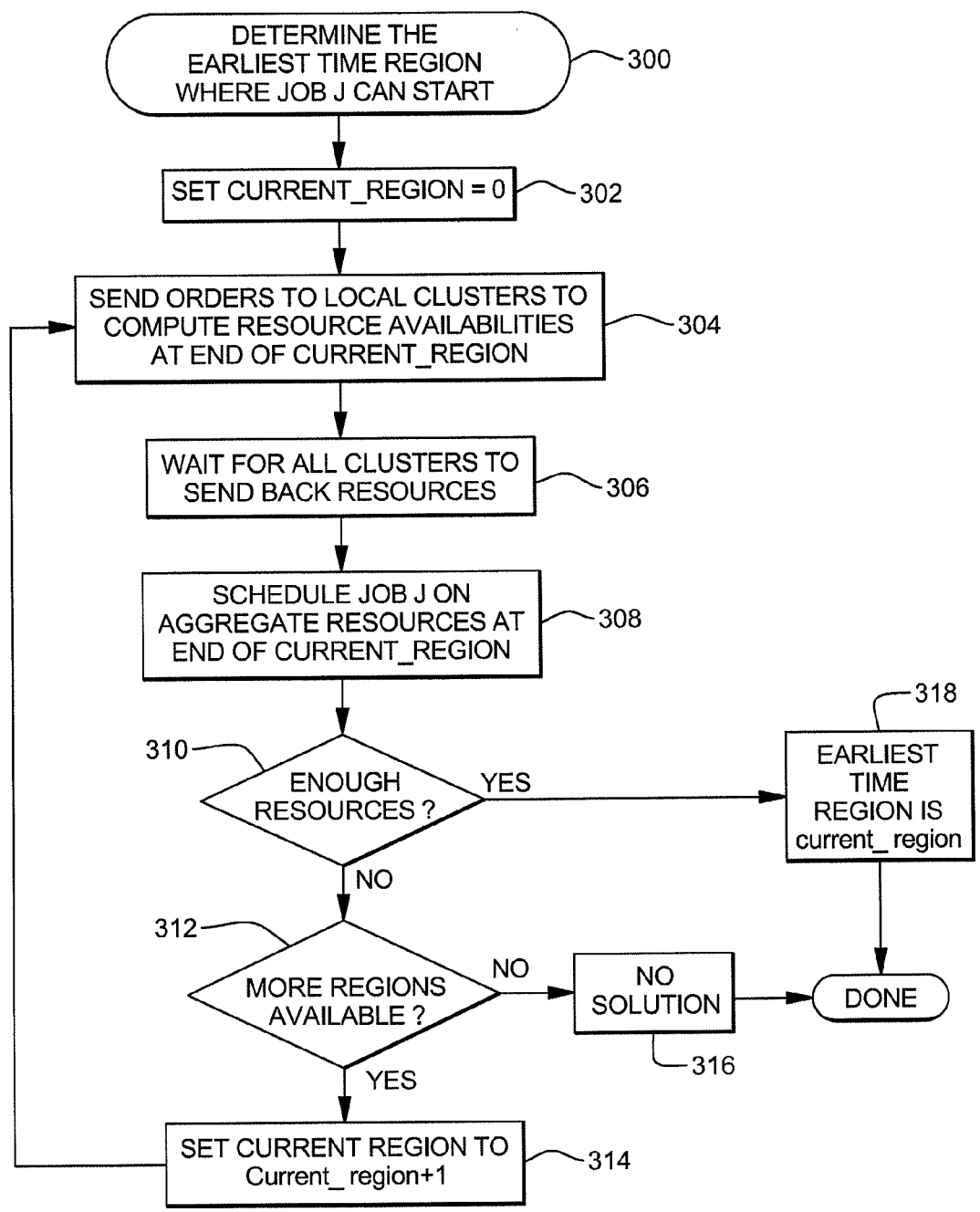
FIG. 3 depicts one embodiment of the logic for determining an earliest time region in which a job can start, in accordance with an aspect of the present invention.

With this information, the main manager determines an earliest time region where job J can start, STEP 206. This is described in further detail below. Thereafter, the main manager determines the earliest future start time within the region when job J can start, STEP 208. In one example, an n-ary search is used in order to determine the earliest future start time. This is also described in further detail below. With reference to FIG. 3, one embodiment of the logic used to determine the earliest time region in which job J can start is described in further detail. STEP 300 is an entry point into the logic that receives as an argument job J for which the earliest time region is determined. It also receives a list of resource consume times. The time region is defined by each resource consume time. The end of the current time region is defined as the resource consume time that defines the time region minus the wallclock time of job J.

Initially, a variable referred to as current_region is initialized to zero, STEP 302. The main manager sends a request to each local cluster to compute resource availabilities at the end of the region, designated by current_region, STEP 304. In one example, the local clusters compute this information in parallel. That is, each job scheduler determines its resource availability, and that processing occurs in parallel (or substantially in parallel) to that processing by other job schedulers of the environment.

The main manager waits for the local clusters to send back their corresponding resource availabilities, STEP 306. The main manager then aggregates the resource availabilities from the local clusters to determine if job J can be scheduled on the aggregated resources, STEP 308. If there are not enough resources for job J, INQUIRY 310, then a determination is made as to whether or not there are more regions where job J can be scheduled, INQUIRY 312. If there are more regions, then current_region is incremented by, for instance, one, STEP 314, and processing continues with STEP 304. If, however, there are no more regions, then there is no solution, STEP 316, and processing is complete.

Returning to INQUIRY 310, if there are enough resources, then the earliest time region is the current_region, STEP 318. Therefore, the next step is to determine the earliest future start time for job J within the given time region, as described with reference to FIG. 4.

Figure 4:
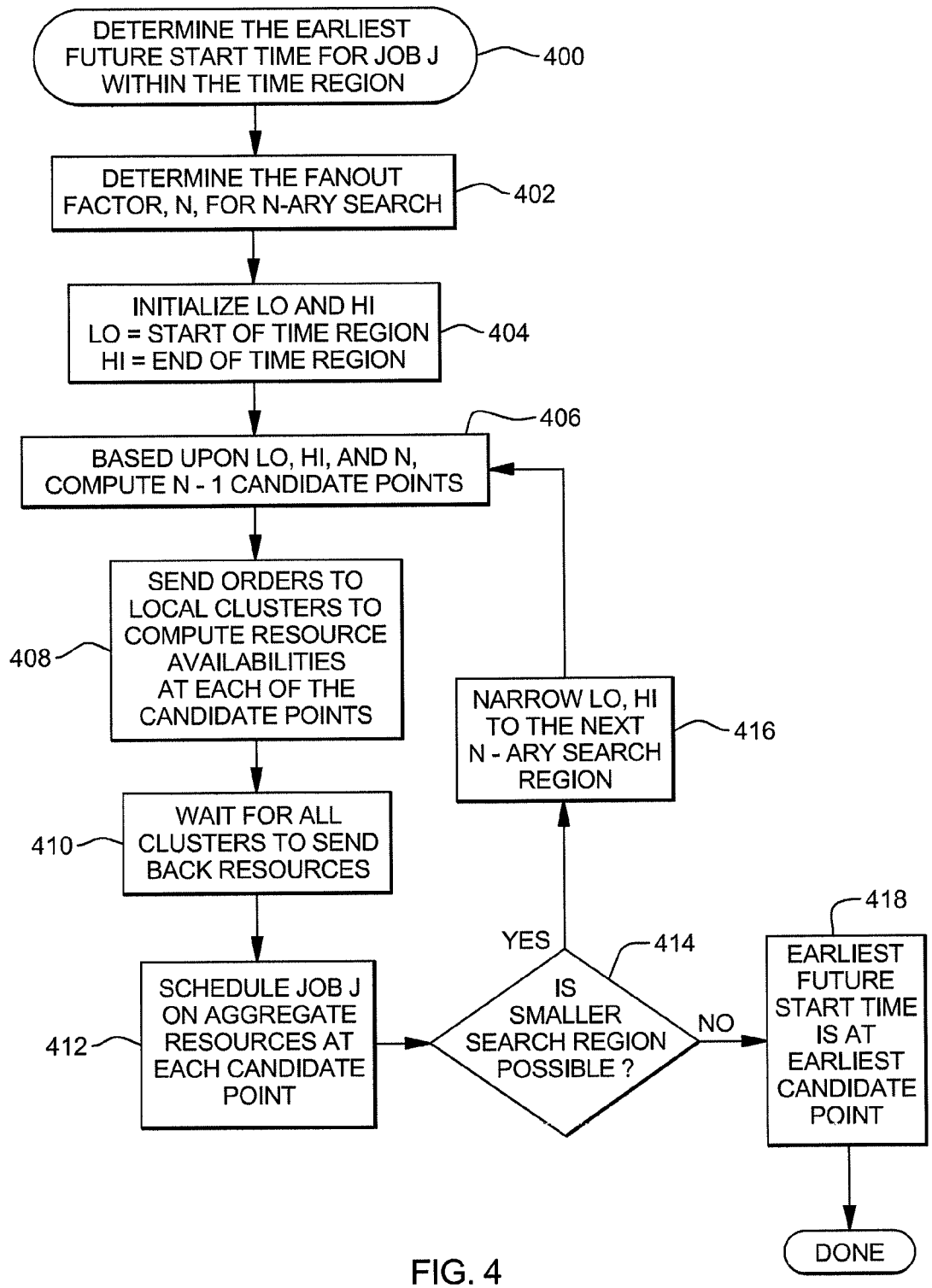
FIG. 4 depicts one embodiment of the logic for determining the earliest future start time for a job within a given time region, in accordance with an aspect of the present invention.

Referring to FIG. 4, in one embodiment, STEP 400 is an entry point into the scheduling logic that receives as an argument job J for which the earliest future start time is to be determined, the time region in which to search, and a list of resource release times. Initially, a fanout factor, n, is determined to use for the n-ary search, STEP 402. A fanout of 2 is a standard binary search, in which the search region is divided into two parts. The middle is evaluated, and a decision is made whether to search the left or the right part. A fanout of n is the n-ary search, in which the search region is divided into n equal parts, each of the n-1 candidate points is evaluated, and a decision is made which part to search. The fanout is determined, in one example, based upon the number of resource release times, communication speed between clusters, and computational speed of each cluster. Values of n=2 to n=5 are typical examples. Thereafter, a lo and hi are initialized as the start of the time region and the end of the time region, respectively, STEP 404. These two values define the current search region for the n-ary search logic.

A determination is then made of the n−1 candidate points at which resource availability information is to be determined, STEP 406. In one example, the number of candidate points is based upon lo, hi, and n. When n=2, the candidate point is the midpoint (hi-lo)/2. When n is greater than 2, the candidate points are n equal intervals from lo to hi, each of size (hi-lo)/n.

The main manager sends requests to each local cluster to compute resource availabilities at each of the candidate points, STEP 408. Again, in this example, the local schedulers compute this information in parallel (or substantially in parallel). The main manager waits for the local clusters to send back their corresponding resource availabilities, STEP 410. Upon receipt of the information, the main manager aggregates the resource availabilities from the local clusters at each candidate point and determines at which one or more candidate points there are sufficient resources to schedule job J, STEP 412.

Thereafter, a decision is made as to whether a smaller search region can be searched, INQUIRY 414. There is a smaller search region when, for instance, hi-lo>n−1. If there is a smaller search region, the logic proceeds with narrowing lo and/or hi to the next n-ary search region, STEP 416. Processing then continues at STEP 406.

Returning to INQUIRY 414, if there is not a smaller search region, then the main manager determines that the earliest future start time is at the earliest candidate point found throughout the course of the logic, STEP 418. This concludes processing.

In accordance with an aspect of the present invention, the scheduling logic employs two phases to compute the job start time. The first phase performs a linear search for the first time region where the job can run. A time region is a period of time during which the resource availabilities are monotonically increasing. This means that in that time region, resources are only released. At each time point where resources are consumed in some cluster, there is a possibility of an overall decrease in resource availabilities, and so at that point, the monotonicity of resource availabilities is violated. Thus, each resource consumer implies a new time region.

Given R time regions, the first phase sends K requests to each cluster to return resource availabilities at the ends of each of the requested K time regions. This is repeated at most R/K times or until a first time region that has enough resources for the job is found. For example, assume there are 15 time regions, that the first time region that has enough resources for the job is region 9, and that it is acceptable to send five requests to the clusters at the same time. Thus, R=15, K=5. The first request is for regions 1 through 5. After the clusters respond, the main manager determines that there are not enough resources. Thus, a second request is sent for regions 5 through 10. After the clusters respond, the main manager determines that region 9 is the first region that has enough resources for the job. At this time, region 9 is selected and the first phase of the logic completes. The logic proceeds to the second phase, which will use an n-ary search to find the earliest start time in region 9.

The second phase uses an n-ary search (n=2 or more) to find the earliest future start time within the given time region. In this phase, based upon the number of job end times in the region, the main manager selects the fanout factor, n, for the n-ary search. Then, based upon the endpoints of the region, it selects the midpoints. For each midpoint, for each cluster, the main manager chooses the time to check for the corresponding cluster at which resources have not yet been computed. The main manager sends the request to each cluster and waits for responses. After the responses are received, the main manager checks each midpoint to determine whether the clusters provide enough resources for the job. If not, the next set of midpoints are selected and the above is repeated, until a satisfactory solution (or no solution) is found.

Figure 5:
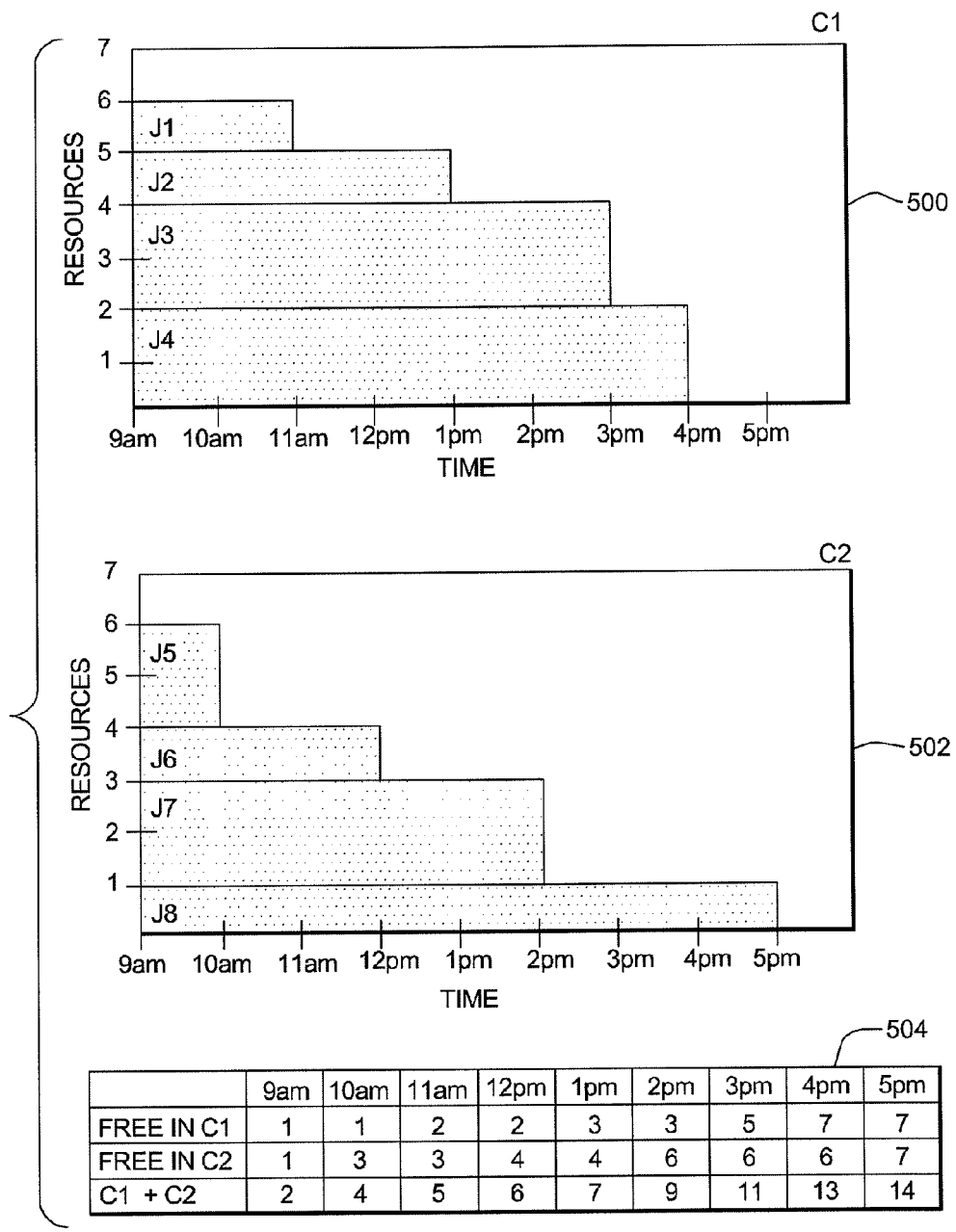
FIG. 5 depicts two clusters executing a plurality of jobs and the available resources associated with those clusters, in accordance with an aspect of the present invention.

Further details and alternatives are provided with reference to the example of FIG. 5. Assume two clusters, C1 (500) and C2 (502) have a total of 8 running jobs and have the resource availabilities as indicated in table 504.

Now, consider a new job that requires 8 nodes. Clusters C1 and C2 do not have enough resources for this job to start now, at 9 am. Thus, the main manager searches (e.g., via a binary search) for the earliest future start time for this job.

The main manager chooses a midpoint between endpoints 9 am and 5 pm, (the selected time region) which is 1 pm. In C1, there is a job ending at 1 pm, and resources in C1 at 1 pm have not yet been discovered by the main manager. A request for 1 pm resources is sent to C1. In C2, there is no job ending at 1 pm, but the closest job ending before 1 pm for which resources have not yet been discovered ends at 12 pm. A request for 12 pm resources is sent to C2.

In response to receiving the replies to the requests, the main manager knows the following:

|           | 9 am | 10 am | 11 am | 12 pm | 1 pm | 2 pm | 3 pm | 4 pm | 5 pm |
|-----------|------|-------|-------|-------|------|------|------|------|------|
| free in C1 |      |       |       |       | 3 | 3    |      |      |      |
| free in C2 |      |       |       | 4 | 4    |      |      |      |      |
| C1 + C2   |      |       |       |       | 7    |      |      |      |      |

The bold text entries show actual availabilities as reported by the responses. Normal text entries show projected availabilities. As shown in the table, at 1 pm in C2, the same amount is available as at 12 pm in C2, since no job completes between 12 pm and 1 pm in C2. Thus, the projected availability at 1 pm is 4 nodes. Therefore, at 1 pm, the main manager finds that a total of 7 nodes are available for the job, which is not sufficient.

The main manager chooses the next midpoint between endpoints 2 pm and 5 pm, which is 3 pm. In C1, there is a job ending at 3 pm, and 3 pm resources in C1 have not yet been discovered by the main manager. A request for 3 pm resources is sent to C1. In C2, there is no job ending at 3 pm, but the closest job ending before 3 pm for which resources have not yet been discovered ends at 2 pm. A request for 2 pm resources is sent to C2. In response to the request, the clusters send their responses and the main manager knows the following:

|           | 9 am | 10 am | 11 am | 12 pm | 1 pm | 2 pm | 3 pm | 4 pm | 5 pm |
|-----------|------|-------|-------|-------|------|------|------|------|------|
| free in C1 |      |       |       |       | 3    | 3    | 5 |      |      |
| free in C2 |      |       |       | 4     | 4    | 6 | 6    | 6    |      |
| C1 + C2   |      |       |       |       | 7    | 9    | 11   |      |      |

At 3 pm, the main manager finds that 11 nodes are available for the job, which is sufficient.

The main manager realizes that the last midpoint that is to be checked is 2 pm, since it knows that at 1 pm the job cannot start and at 3 pm it can. The main manager looks at the above table and determines that resource availabilities are already known at 2 pm from previous computations, and thus, it does not need to go back to the clusters for resource availabilities.

From the table, it determines that at 2 pm, 9 nodes are available for the job, which is sufficient. Thus, the earliest start time of 2 pm is assigned to the job.

In the above example that has two clusters with a total of eight running jobs, the earliest start time is discovered for the job within three attempts ($3=\log_2(8)$) using a binary search. Out of the three attempts, only two required transactions to the clusters for resources. This example illustrates a technique of requesting resources at the closest time with undiscovered resources around the requested time and projecting resources to later times, to save extra transactions back to cluster. Consider the binary search point at 3 pm. In C1, there is a job ending at 3 pm, and at 3 pm resources have not yet been discovered, so a request for 3 pm resources is sent to C1. At the same time, in C2, there is no job ending at 3 pm, but the closest job ending before 3 pm for which resources have not yet been discovered ends at 2 pm. Thus, a request for 2 pm resources is sent to C2. As a result, with a single request to C2, 2 pm, 3 pm and 4 pm resources are discovered, since the next job end time after 2 pm is at 5 pm, and resources are constant from 2 pm to 4 pm. Similarly, 2 pm resources in C1 are the same as 1 pm resources in C1. As a result, when 2 pm resources are requested by the binary search, it is not necessary to send requests for resources to the clusters, since the information is known from the previous resource request.

In an alternative embodiment, lowerbound resources may be used. It is based on observation that if in cluster X at time T, R is available, then at T'>T, at least R will be available. The lowerbound resources can be used to decrease the number of transactions to send to the clusters. For example, suppose that in cluster X1 it is known that at 4 pm 10 nodes are available, and that in cluster X2 at 2 pm it is known that 5 nodes are available. Even if in X2 there are jobs ending between 2 pm and 4 pm, the lowerbound resources available at 4 pm in X2 are at least 5 nodes. Thus, if a job requires at most 15 nodes, it is not necessary to send a transaction to X2 for 4 pm resources, and it can be assumed that 4 pm resources from X1 and X2 are sufficient for that job.

The above example demonstrates scheduling inside a time region that has monotonically increasing resources availabilities. Monotonically increasing resource availabilities inside each time region enable an n-ary search to be performed.

Described in detail herein is an efficient capability for determining a start time, including an earliest start time, for a job to be executed in the future. The start time is computed in logarithmic time, as opposed to linear time. In response to determining the start time, resources are assigned to the job, and the job will start at the scheduled start time.

Further details regarding cluster processing may be found in U.S. Ser. No. 12/023,584, entitled "A System To Improve Cluster Machine Processing And Associated Methods," filed Jan. 31, 2008, which is hereby incorporated herein by reference in its entirety.

In addition to the above, one or more aspects of the present invention can be provided, offered, deployed, managed, serviced, etc. by a service provider who offers management or scheduling of customer environments. For instance, the service provider can create, maintain, support, etc. computer code and/or a computer infrastructure that performs one or more aspects of the present invention for one or more customers. In return, the service provider can receive payment from the customer under a subscription and/or fee agreement, as examples. Additionally or alternatively, the service provider can receive payment from the sale of advertising content to one or more third parties.

In one aspect of the present invention, an application can be deployed for performing one or more aspects of the present invention. As one example, the deploying of an application comprises providing computer infrastructure operable to perform one or more aspects of the present invention.

As a further aspect of the present invention, a computing infrastructure can be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer usable medium, in which the computer medium comprises one or more aspects of the present invention. The code in combination with the computer system is capable of performing one or more aspects of the present invention.

One or more aspects of the present invention can be included in an article of manufacture (e.g., one or more computer program products) having, for instance, computer readable media. The media has therein, for instance, computer readable program code means or logic (e.g., instructions, code, commands, etc.) to provide and facilitate the capabilities of the present invention. The article of manufacture can be included as a part of a computer system or sold separately.

Figure 6:
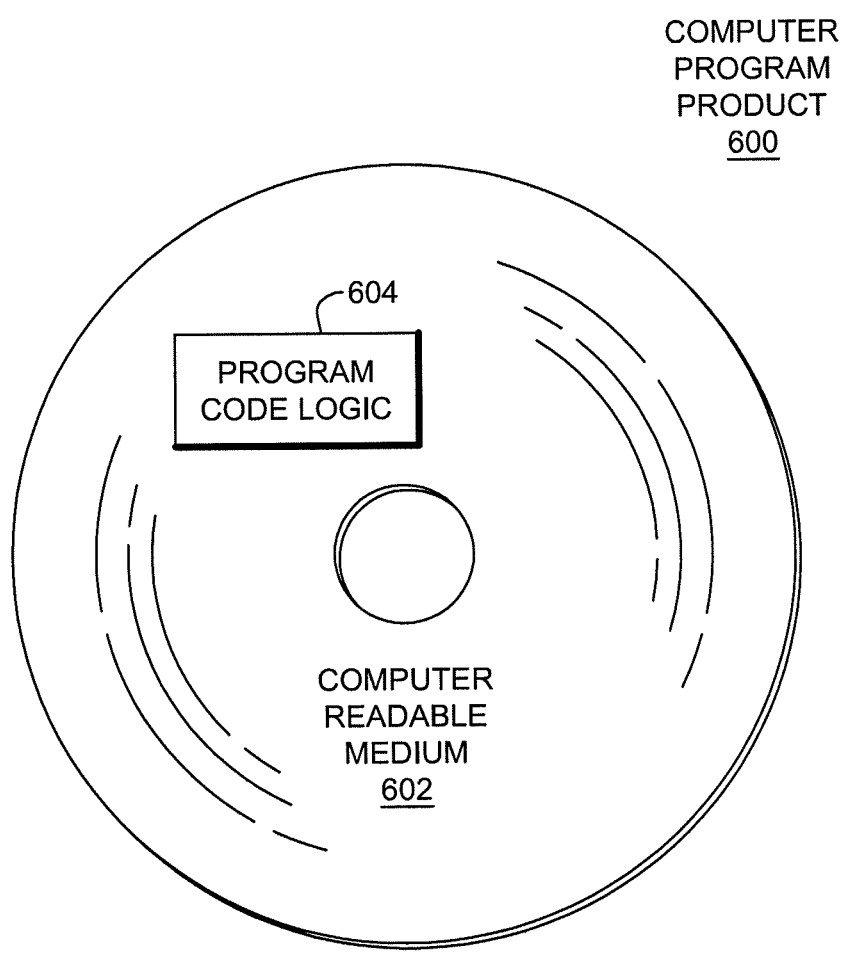
FIG. 6 depicts one embodiment of a computer program product to incorporate one or more aspects of the present invention.

One example of an article of manufacture or a computer program product incorporating one or more aspects of the present invention is described with reference to FIG. 6. A computer program product 600 includes, for instance, one or more computer readable media 602 to store computer readable program code means or logic 604 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Advantageously, the start time of a job is computed in logarithmic time as opposed to linear time. This is a significant improvement in the time it takes to schedule a job and allows much larger workloads to be handled. The technique is more scalable, and less data is transmitted among schedulers because each local scheduler sends only the data required for the binary or n-ary search, which is less than the data required for other techniques.

Although various embodiments are described above, these are only examples. For instance, although examples of clusters are provided herein, these are only examples. Each cluster can include more or less computers or other processing units than depicted herein. Further, the local manager can be on any of the computers within the cluster or may be distributed among a plurality of the computers within a cluster. In yet a further example, one of the clusters may not include a local manager. Further, the start time can be other than the earliest start time. Many other variations are also possible.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the instruction fetch unit and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A computer-implemented method of facilitating determination of job start times in a multi-cluster environment, said method comprising:
   computing, by a processor, a start time for a job to be executed across multiple clusters of the multi-cluster environment, the computing using multiple phases of processing including:
      determining, during a first phase of the multiple phases, a time region in which a job can execute in the multi-cluster environment, said time region comprising a period of time in which resource availabilities of a plurality of clusters of the multi-cluster environment are monotonically increasing in that resources are released during that period of time and resources are not consumed during that period of time;
      choosing, during a second phase of the multiple phases, for the determined time region, one or more selected points within the time region at which resource availability information is to be obtained, the choosing using an n-ary search, and the choosing comprising:
         obtaining a list of resource release times for the plurality of clusters, wherein a resource release time is a point in time on a cluster when it is known that a resource is released;
         determining a fanout factor for the n-ary search, the fanout factor based, at least in part, on the list of resource release times; and
         determining, based on the fanout factor, a start of the determined time region, and an end of the determined time region, the one or more selected points within the time region;
      obtaining for the plurality of clusters resource availability information at the chosen one or more selected points within the time region; and
      using the resource availability information of the plurality of clusters to determine a start time for the job to be executed across multiple clusters of the multi-cluster environment.

2. The computer-implemented method of claim 1, wherein the determined start time is the earliest start time for the job.

3. The computer-implemented method of claim 1, further comprising synchronizing a plurality of local managers of the plurality of clusters, wherein the synchronizing comprises freezing scheduling of resources of the plurality of clusters, prior to determining the time region.

4. The computer-implemented method of claim 1, wherein the time region comprises an earliest time region in which the job can start.

5. The computer-implemented method of claim 1, wherein determining the time region comprises:
   sending to the plurality of clusters a request for resource information from the plurality of clusters, wherein the request comprises a request for resource release times of the plurality of clusters and a request for resource consume times of the plurality of clusters, and wherein a resource consume time is a point in time on a cluster when it is known that a resource is consumed; and
   responsive to receipt of the resource information from the plurality of clusters, merging the resource release times into the list of resource release times for the plurality of clusters, and merging the resource consume times into an aggregate list of resource consume times, the aggregate list of resource consume times defining one or more time regions from which the determined time region is to be determined.

6. The computer-implemented method of claim 1, wherein the method further comprises:
   sending a request to a plurality of local managers of the plurality of clusters to determine resource availability at the one or more selected points;
   receiving by a main manager the requested resource availability at the one or more selected points, and determining resource availability at the one or more selected points; and using the determined resource availability to compute the start time.

7. The computer-implemented method of claim 1, wherein the obtaining resource availability information further comprises determining resource availability within the time region by a plurality of local managers of the plurality of clusters, wherein the determining resource availability is performed in parallel by the plurality of local managers.

8. The computer-implemented method of claim 1, wherein the start time of the job is determined in logarithmic time, rather than linear time.

9. The computer-implemented method of claim 1, wherein the fanout factor is based, in part, on a number of resource release times in the list of resource release times, and is based further on communication speed between the clusters, and computational speed of the plurality of clusters.

10. The computer-implemented method of claim 5, wherein determining the time region further comprises:
    setting a current time region of the one or more time regions;
    sending a request to the plurality of clusters for resource availabilities of the plurality of clusters at the end of the current time region, the end of the current time region being defined by the time region minus a wallclock time of the job to be executed;
    aggregating the resource availabilities of the plurality of clusters to determine whether there are sufficient resources to execute the job during the current time region; and
    responsive to there not being sufficient resources to execute the job during the current time region, incrementing the current region to a next time region defined by the aggregate list of resource consume times, and repeating the sending and the aggregating for the next time region.

11. The computer-implemented method of claim 5, wherein the one or more time regions comprises multiple time regions, and wherein the determining the time region further comprises:
    sending from a main manager to a plurality of local managers of the plurality of clusters a request for resource availability for a plurality of time regions of the multiple time regions;
    receiving at the main manager the resource availabilities for the plurality of time regions;
    determining by the main manager whether one time region of the plurality of time regions has sufficient resource availability for the job to execute; and
    repeating the sending, receiving, and determining for at least one other plurality of time regions of the multiple time regions until a time region with sufficient resource availability for the job is found or there are no more time regions to be processed.

12. The computer-implemented method of claim 6, further comprising:
    determining if a smaller search region is to be searched; and
    if a smaller search region is to be searched, redefining at least one of the start time or the end time, repeating the choosing using the redefined start and end times, and repeating the sending, the receiving and the determining.

13. The computer-implemented method of claim 10 wherein, responsive to there being sufficient resources to execute the job during the current time region, selecting the current time region as the determined time region.

14. The computer-implemented method of claim 11, further comprising determining resource availability at the plurality of clusters for the plurality of time regions, wherein the determining of resource availability is performed in parallel by the plurality of local managers.

15. A computer system for facilitating determination of job start times in a multi-cluster environment, said computer system comprising:
    a memory; and
    a processor in communications with the memory, wherein the computer system is configured to perform a method, said method comprising:
        computing a start time for a job to be executed across multiple clusters of the multi-cluster environment, the computing using multiple phases of processing including:
            determining, during a first phase of the multiple phases, a time region in which a job can execute in the multi-cluster environment, said time region comprising a period of time in which resource availabilities of a plurality of clusters of the multi-cluster environment are monotonically increasing in that resources are released during that period of time and resources are not consumed during that period of time;
            choosing, during a second phase of the multiple phases, for the determined time region, one or more selected points within the time region at which resource availability information is to be obtained, the choosing using an n-ary search, and the choosing comprising:
                obtaining a list of resource release times for the plurality of clusters, wherein a resource release time is a point in time on a cluster when it is known that some resource is released;
                determining a fanout factor for the n-ary search, the fanout factor based, at least in part, on the list of resource release times; and
                determining, based on the fanout factor, a start of the determined time region, and an end of the determined time region. the one or more selected points within the time region;
            obtaining for the plurality of clusters resource availability information at the chosen one or more selected points within the time region; and
            using the resource availability information of the plurality of clusters to determine a start time for the job to be executed across multiple clusters of the multi-cluster environment.

16. The computer system of claim 15, wherein the method further comprises synchronizing a plurality of local managers of the plurality of clusters, wherein the synchronizing comprises freezing scheduling of resources of the plurality of clusters, prior to determining the time region.

17. The computer system of claim 15, wherein the method further comprises determining resource availability at the plurality of clusters for one or more time regions, wherein the determining of resource availability is performed in parallel by the plurality of local managers.

18. The computer system of claim 15, wherein the start time of the job is determined in logarithmic time, rather than linear time.

19. The computer system of claim 15, wherein the determining the time region comprises:
    sending to the plurality of clusters a request for resource information from the plurality of clusters, wherein the request comprises a request for resource release times of the plurality of clusters and a request for resource consume times of the plurality of clusters, and wherein a resource consume time is a point in time on a cluster when it is known that a resource is consumed; and responsive to receipt of the resource information from the plurality of clusters, merging the resource release times into the list of resource release times for the plurality of clusters, and merging the resource consume times into an aggregate list of resource consume times, the aggregate list of resource consume times defining one or more time regions from which the determined time region is to be determined.

20. A computer program product to facilitate determination of job start times in a multi-cluster environment, the computer program product comprising:

a non-transitory computer readable storage medium readable by a processing circuit and storing instructions for execution by the processing circuit for performing a method comprising:

computing, by a processor, a start time for a job to be executed across multiple clusters of the multi-cluster environment, the computing using multiple phases of processing including:

determining, during a first phase of the multiple phases, a time region in which a job can execute in the multi-cluster environment, said time region comprising a period of time in which resource availabilities of a plurality of clusters of the multi-cluster environment are monotonically increasing in that resources are released during that period of time and resources are not consumed during that period of time;

choosing, during a second phase of the multiple phases, for the determined time region, one or more selected points within the time region at which resource availability information is to be obtained, the choosing using an n-ary search, and the choosing comprising:

obtaining a list of resource release times for the plurality of clusters, wherein a resource release time is a point in time on a cluster when it is known that a resource is released;

determining a fanout factor for the n-ary search, the fanout factor based, at least in part, on the list of resource release times; and determining, based on the fanout factor, a start of the determined time region, and an end of the determined time region, the one or more selected points within the time region;

obtaining for the plurality of clusters resource availability information at the chosen one or more selected points within the time region; and using the resource availability information of the plurality of clusters to determine a start time for the job to be executed across multiple clusters of the multi-cluster environment.

21. The computer program product of claim 20, wherein the method further comprises synchronizing a plurality of local managers of the plurality of clusters, wherein the synchronizing comprises freezing scheduling of resources of the plurality of clusters, prior to determining the time region.

22. The computer program product of claim 20, wherein determining the time region comprises:

sending to the plurality of clusters a request for resource information from the plurality of clusters, wherein the request comprises a request for resource release times of the plurality of clusters and a request for resource consume times of the plurality of clusters, and wherein a resource consume time is a point in time on a cluster when it is known that a resource is consumed; and responsive to receipt of the resource information from the plurality of clusters, merging the resource release times into the list of resource release times for the plurality of clusters, and merging the resource consume times into an aggregate list of resource consume times, the aggregate list of resource consume times defining one or more time regions from which the determined time region is to be determined.

23. The computer program product of claim 20, wherein the obtaining resource availability information further comprises determining resource availability within the time region by a plurality of local managers of the plurality of clusters, wherein the determining resource availability is performed in parallel by the plurality of local managers.

24. The computer product of claim 22, wherein the one or more time regions comprises multiple time regions, and wherein the determining the time region further comprises:

sending from a main manager to a plurality of local managers of the plurality of clusters a request for resource availability for a plurality of time regions of the multiple time regions;

receiving at the main manager the resource availabilities for the plurality of time regions;

determining by the main manager whether one time region of the plurality of time regions has sufficient resource availability for the job to execute; and repeating the sending, receiving, and determining for at least one other plurality of time regions of the multiple time regions until a time region with sufficient resource availability for the job is found or there are no more time regions to be processed.

25. The computer program product of claim 24, wherein the method further comprises determining resource availability at the plurality of clusters for the plurality of time regions, wherein the determining of resource availability is performed in parallel by the plurality of local managers.

* * * * *